United States Patent [19]
König

[11] Patent Number: 5,115,924
[45] Date of Patent: May 26, 1992

[54] SHELF SYSTEM

[75] Inventor: Jochen König, Strasslach, Fed. Rep. of Germany

[73] Assignee: Beatrice König-Haug, Strasslach, Fed. Rep. of Germany

[21] Appl. No.: 623,958

[22] PCT Filed: May 31, 1989

[86] PCT No.: PCT/EP89/00611
§ 371 Date: Jan. 28, 1991
§ 102(e) Date: Jan. 28, 1991

[87] PCT Pub. No.: WO89/11813
PCT Pub. Date: Dec. 14, 1989

[30] Foreign Application Priority Data

May 31, 1988 [DE] Fed. Rep. of Germany ....... 3818525
Jun. 8, 1988 [DE] Fed. Rep. of Germany ....... 3819512

[51] Int. Cl.⁵ .............................................. A47F 5/00
[52] U.S. Cl. .................................... 211/186; 211/187; 248/245
[58] Field of Search ...................... 211/187, 182, 186; 248/241, 242, 245; 108/6, 9

[56] References Cited

U.S. PATENT DOCUMENTS

| 749,670 | 1/1904 | Gardner | 248/242 |
| 1,705,237 | 3/1929 | Bulman | 211/150 |
| 2,963,170 | 12/1960 | Lori | 248/242 X |

FOREIGN PATENT DOCUMENTS

| 259796 | 2/1968 | Austria | 248/242 |
| 2538868 | 1/1983 | France . | |
| 601781 | 2/1960 | Italy | 248/242 |

Primary Examiner—Robert W. Gibson, Jr.
Attorney, Agent, or Firm—Hale and Dorr

[57] ABSTRACT

Shelf systems consist of shelf panels, post elements and connecting elements to retain the shelf panels at the post elements, and they are provided to offer to the user a maximum of freedom in the design of an individualized shelf. The invention presents a shelf system wherein the connecting elements include a joint having one degree of freedom and being adapted to be secured in a way that each shelf panel may be fixed in a horizontal position at least two post elements and may be prevented from tilting. In this way it becomes possible to design the post elements such that they extend at an angle relative to the horizontal or that they may also be arched, e.g. for adaptation of the tilt in a room.

17 Claims, 14 Drawing Sheets

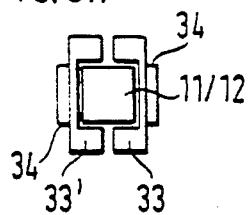
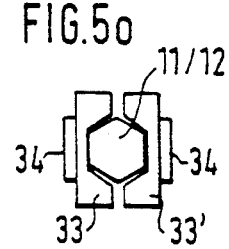
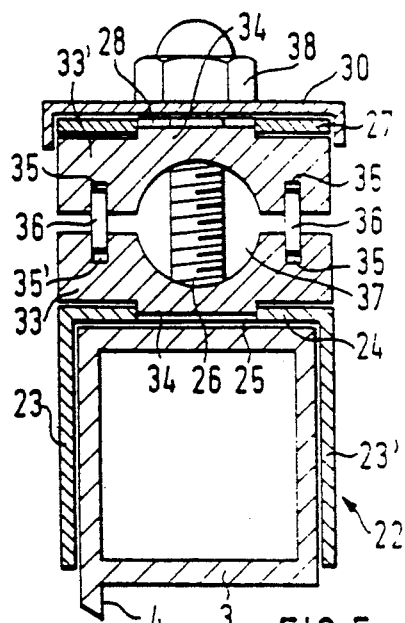
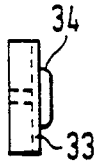
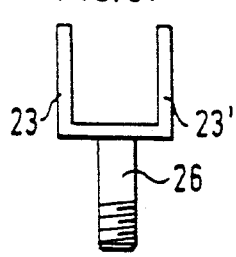
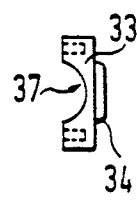
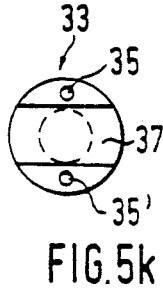
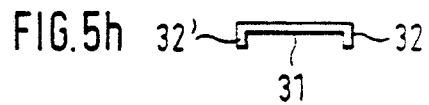
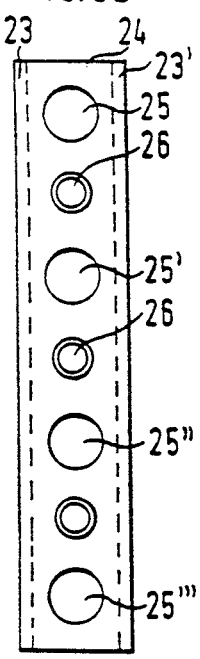
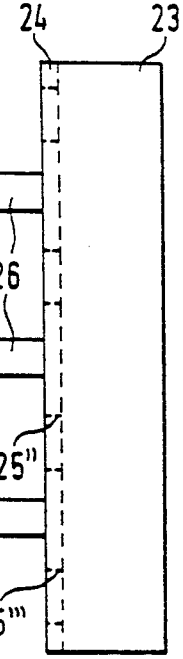
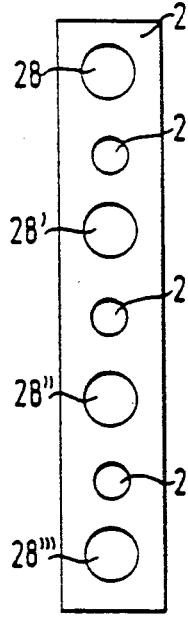
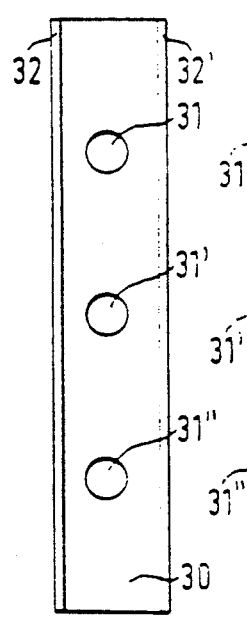

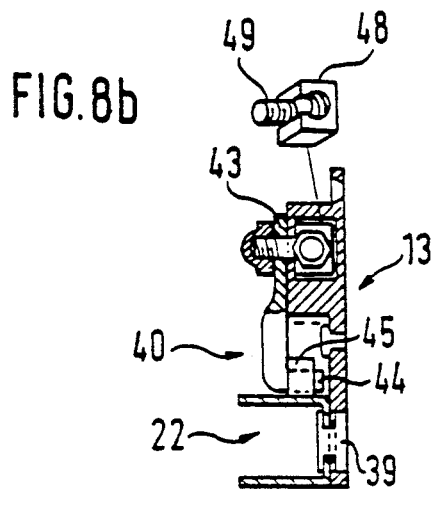
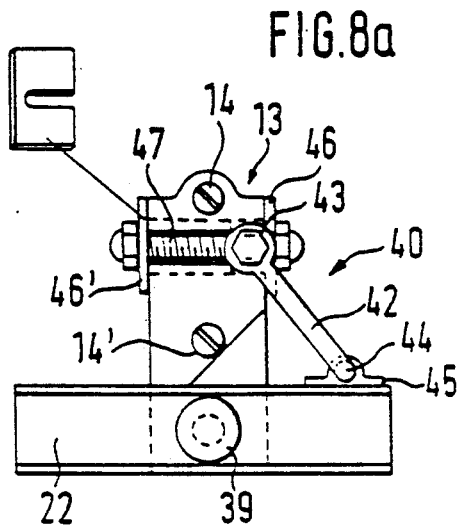
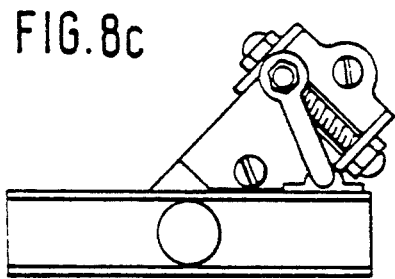
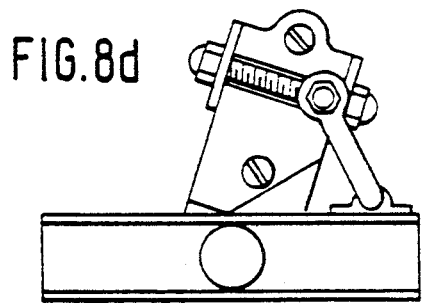
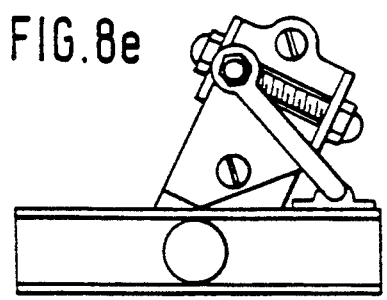
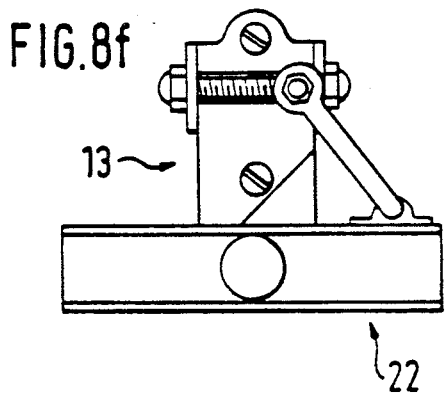

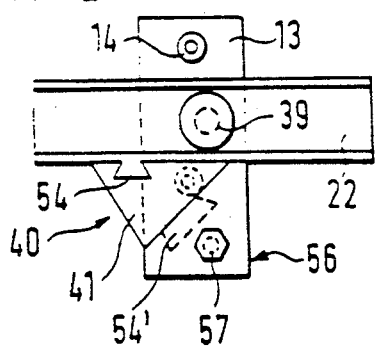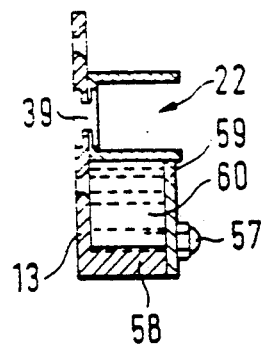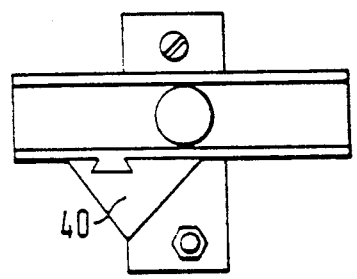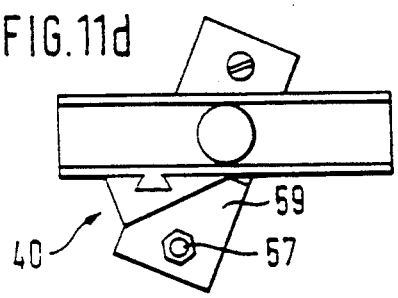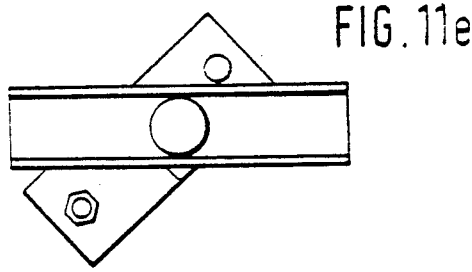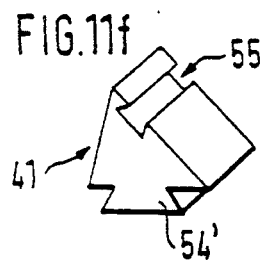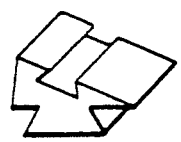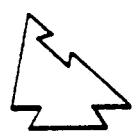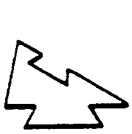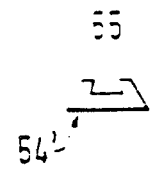

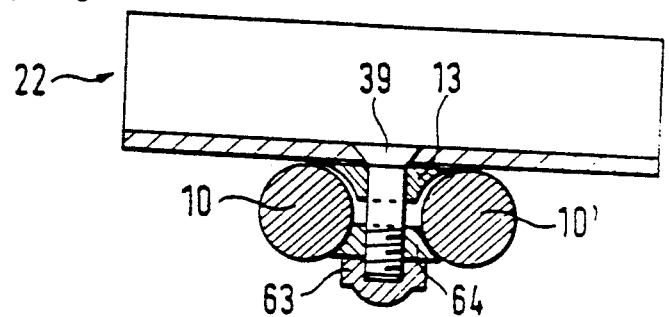
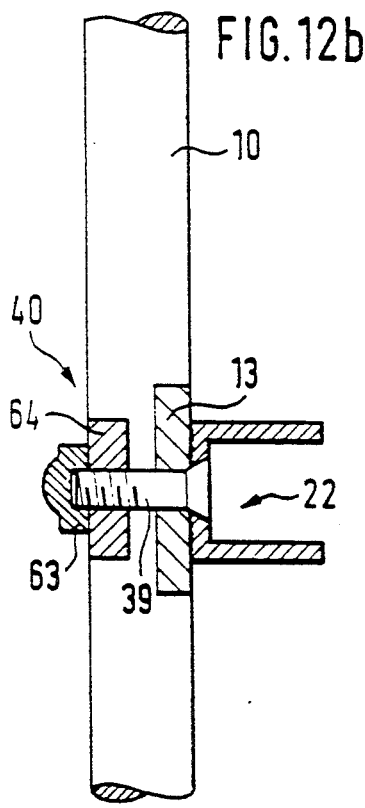
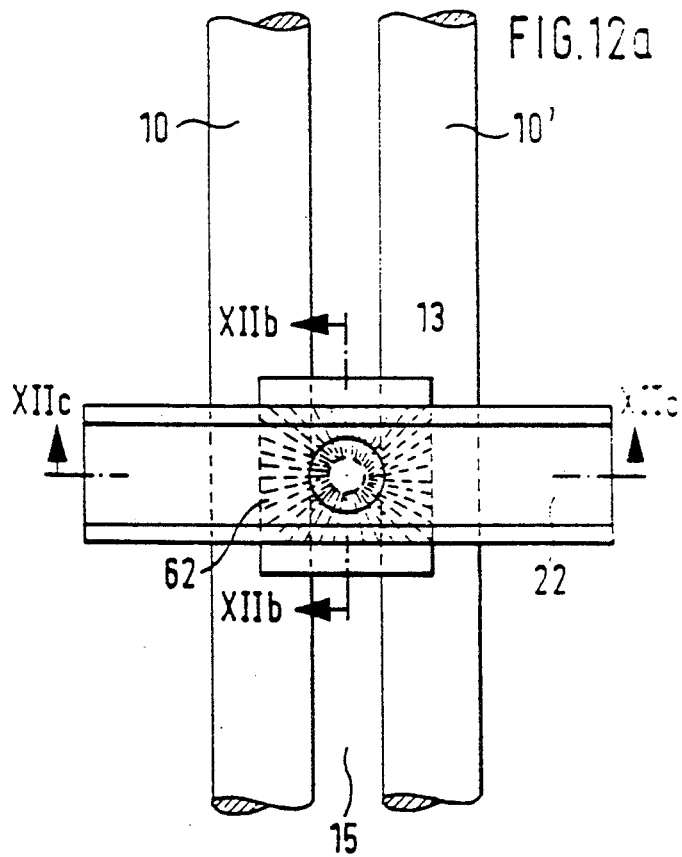

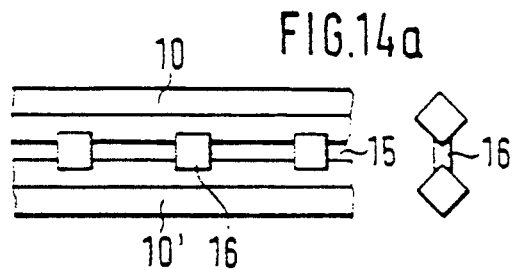
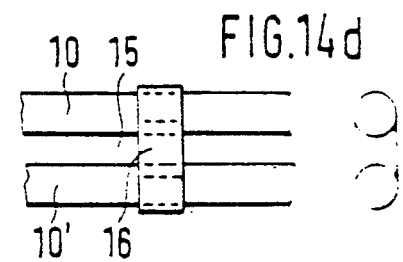
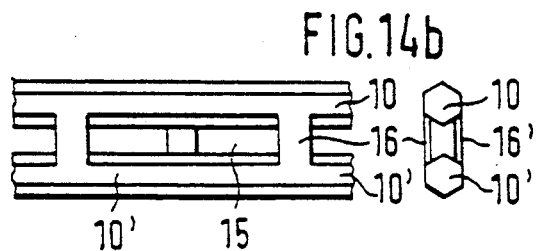
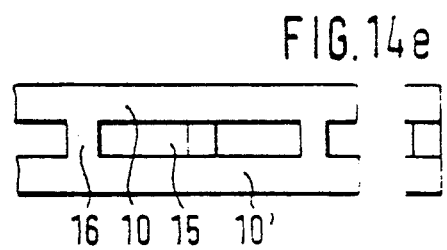
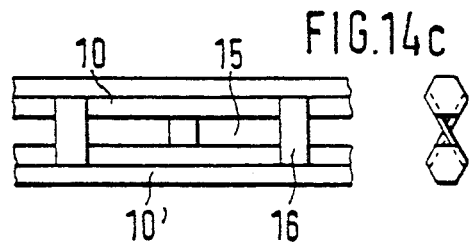
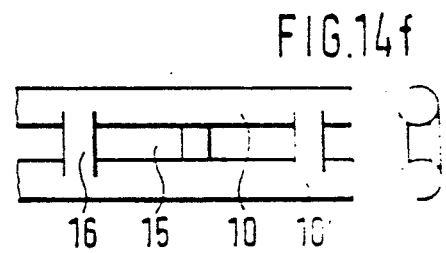
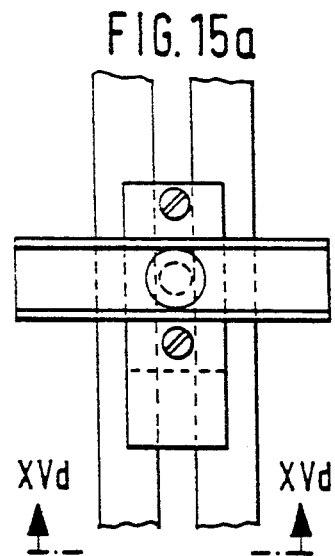
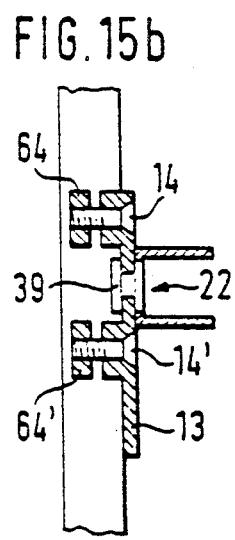
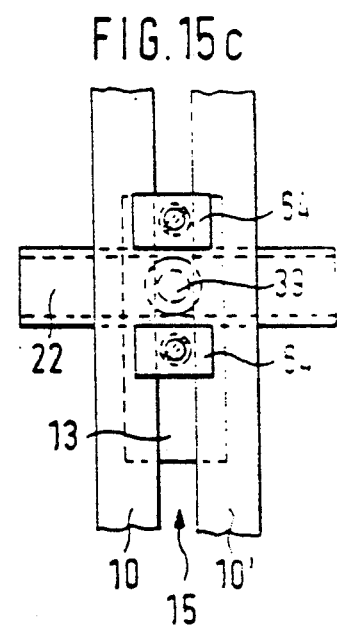
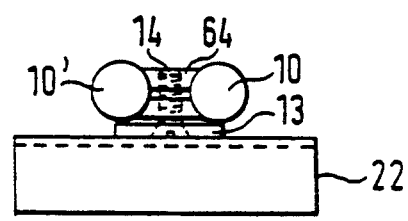

SHELF SYSTEM

The invention relates to a shelf system in accordance with the introductory clause of patent claim 1 or 2.

A great number of shelf systems has become known with which the user purchases a certain number of shelves, post elements and connecting elements which he may use to fasten the shelves at the post elements at graded levels such that he will be able to match the shelf to be set up with his needs correspondingly. On the one hand, this means an adaptation to the required deposit area and on the other hand it means an adaptation to the existing conditions in terms of space and taste. Whenever the user wants to match, for instance, a shelf into a room whose wall extends toward the tilt of the roof the structure of an adapted shelf becomes very difficult, in particular an excessive number of post elements must be used in order to provide for a correct support of the shelves which become successively shorter or displaced in the upward direction. As far as the adaptation of a shelf to characteristics in terms of taste is concerned the use of conventional shelves is bound to use vertical post elements.

One shelf system is known from the German Utility Model DE-GM 19 85 709. In that system several shelves are articulated by their faces near the corners at post elements whereof one pair of post elements displays the supporting function whereas the other pair of post elements is fastened by struts to the first pair of post elements so as to maintain the shelves in an adjustable parallelogram guide. When the supporting posts a placed in vertical position the shelves may be tilted relative to the horizontal so as to be able, for instance, to display books in an inclined position for presentation. With such a system the supporting posts may also be tilted in a direction normal to the longitudinal edges of the shelves so as to maintain them in an arrangement mutually staggered in terms of the shelf depths. With that known system it is not possible either, for instance, to match a shelf with a tilt.

The German Utility Model DE-GM 18 84 722 discloses angular supports which when fastened to vertical posts allow for an inclined positioning of the shelves, too, for presentation of the objects placed thereon. With that system it is not possible either to match the shelf to the conditions prevailing at the installation site.

The French Patent FR-A-11 119 001 discloses a shelf system in accordance with the introductory clause of patent claim 1 or 2. That known system, however, presents only an extremely low stability so that any nonuniform load may result in a tilting motion of the shelf boards.

The present invention is therefore based on the problem of improving a shelf system of the type mentioned by way of introduction to the effect that a high degree of variability is retained while an enhanced stability may be achieved.

This problem is solved either by the subject matter of claim 1 or by the subject matter of claim 2.

In one alternative of an embodiment the post elements are designed as pairs of bars whilst each connecting element includes locking elements, as well in pairs, which are spaced from each other in the longitudinal direction of the shelves. These locking elements may be used to mount each of the bars forming part of a post element at a shelf, at least in the latter's longitudinal direction. The torsional stability of such a connection is achieved due to the fact that when the shelf is tilted relative to the two bars the spacing between the bars ought to be varied. With these bars now being fixed with respect to their mutual spacing, an "automatic" reinforcement of the system is achieved.

In the other alternative of embodiment of the inventive idea, which is set out by way of introduction, a system is provided wherein each post element includes (only) a single bar while each articulation includes a spindle element that extends in the transverse direction of the shelves and may be locked at the post element, as well as at least one anti-rotation locking element which may be secured at the intermediate bar and the shelf. The system with that design is even more variable than the system described before since also arcuate post elements may be easily utilized. Specifically from a design viewpoint the user is here given the maximum of freedom.

Such an anti-rotation locking element preferably includes a connecting element which is fastened by one end to a first attachment point at the shelf, with a spacing from the spindle element and by its other end, with a spacing from the spindle element, too, at a fastening element at the post. This corresponds substantially to a reinforcing element endowed with a triangular stress diagram. For adjustment of the angle enclosed between the shelf and the post element it is now possible to vary each of the edges of the triangle (either individually or several ones jointly), preferably using infinitely variable elements while, whenever necessary, provisions are made for graded "rough" adjustment.

In another alternative embodiment of an anti-rotation locking mechanism the hinge joint is reinforced. In its simplest form this idea can be realized by means of a frictional connection (if necessary with additional form-locking connecting elements).

The attachment of the system at individual post elements is particularly simple when these elements are provided with slots or slit-shaped sections in their longitudinal extension, wherein the connecting elements may be locked. The system is particularly easy to handle in assembly when the connecting elements are designed in the form of units so compact that they may be suspended at the post elements and are also adapted to attachment to the shelves by simple means. With that design it is expedient that the shelves includes a frame, in particular a metal frame, for fastening the connecting elements with the required strength. Panel elements may then be inserted into this frame, whose material (wood, glass, metal, etc.) is left to the user's option, without requiring a modification of the structure or without the necessity to use specific connecting elements for each kind of panel element, respectively.

Further details which are essential of the present invention become obvious from the dependent claims. In the following some preferred embodiments of the invention are described which are explained in more detail with reference to drawings wherein:

Figure 1:
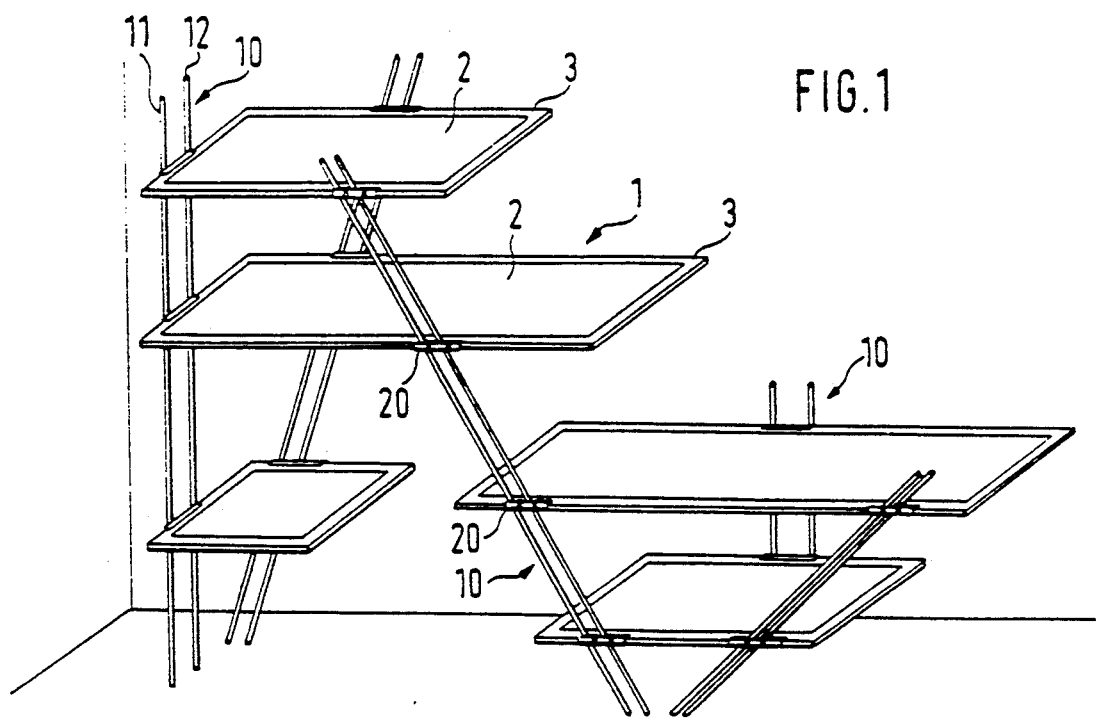
FIG. 1 is a perspective view of an assembled shelf in a first alternative embodiment.
Figure 2:
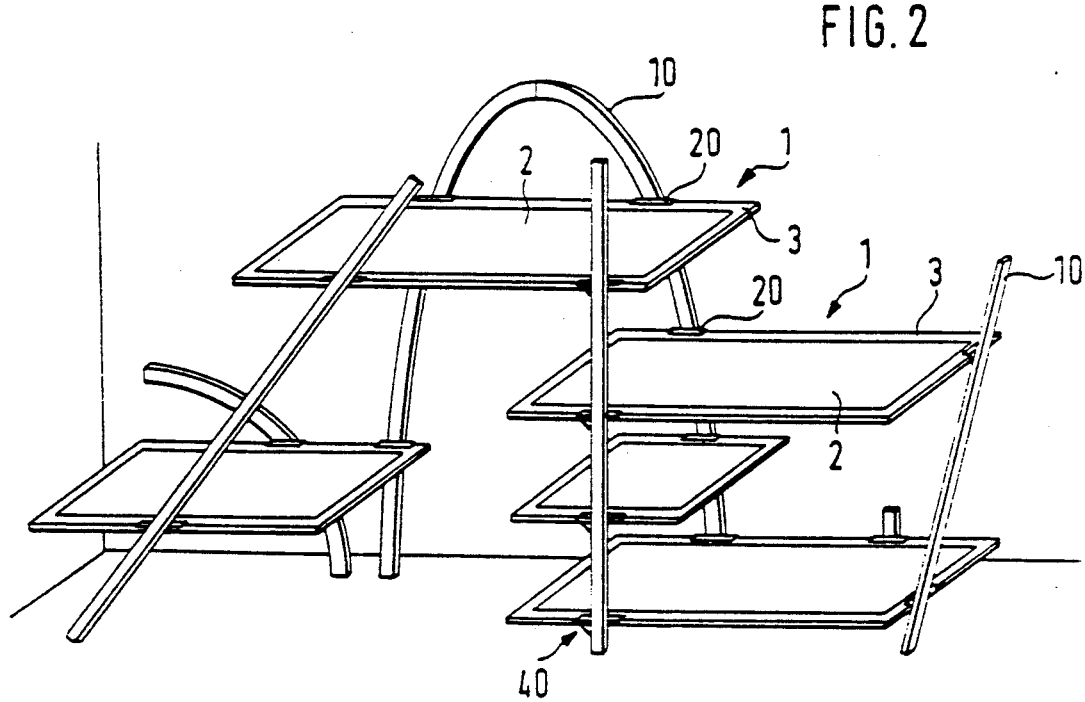
FIG. 2 is a perspective view of a second embodiment.
Figure 3:
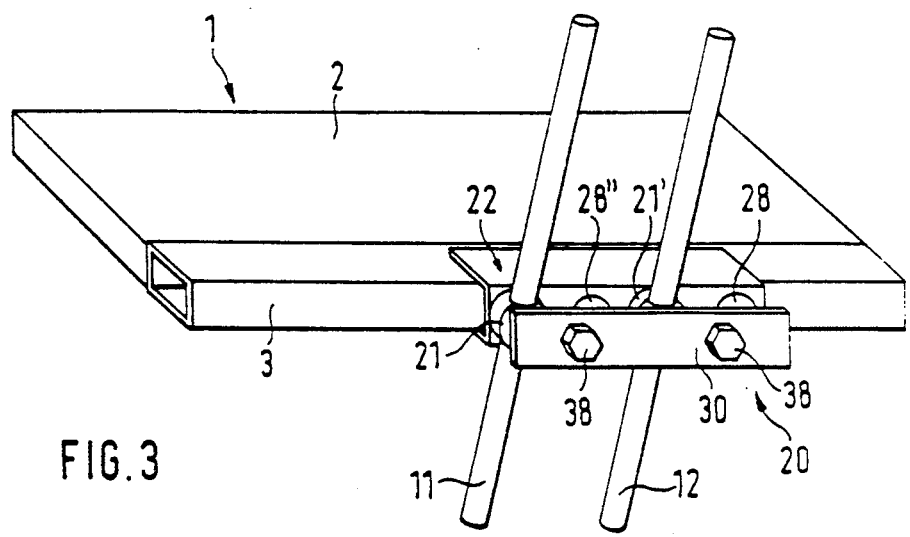
FIG. 3 is a perspective view of a connecting element.
Figure 4A:
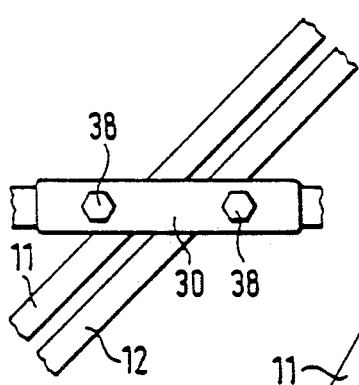
Figure 4B:
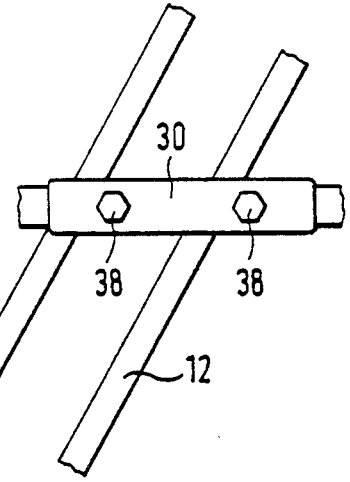
Figure 4C:
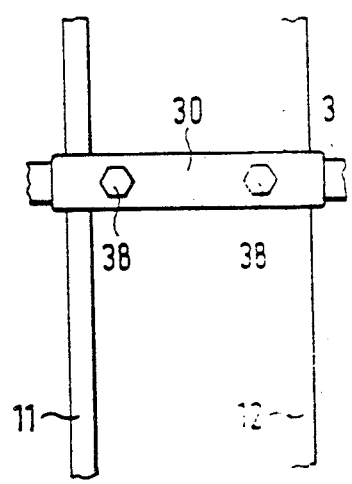
Figure 6A:
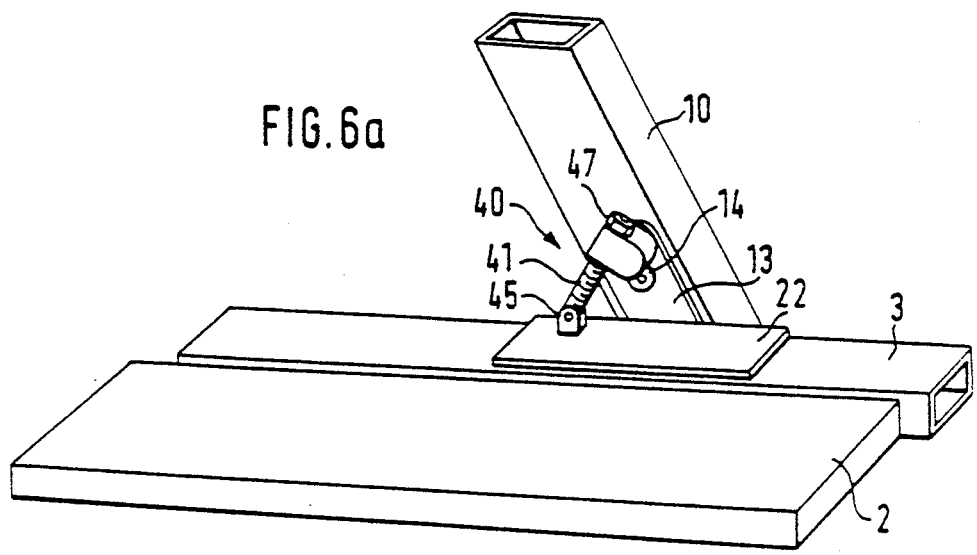
Figure 6C:
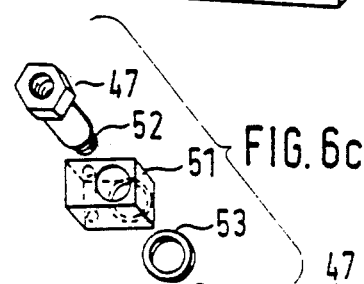
Figures 6B, 6D:
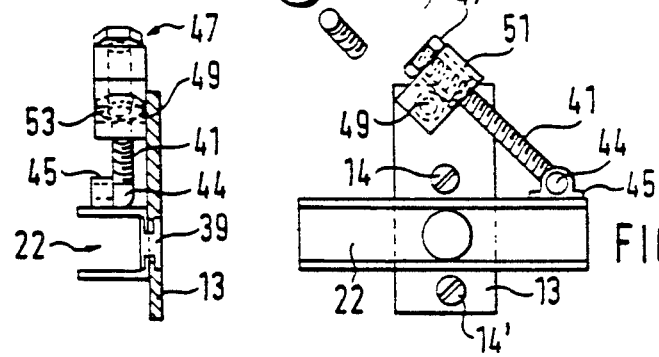
Figure 6E:
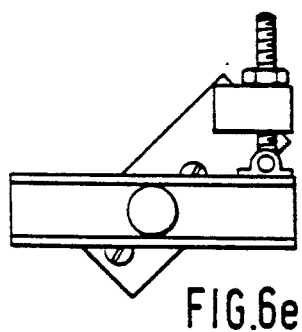
Figure 6F:
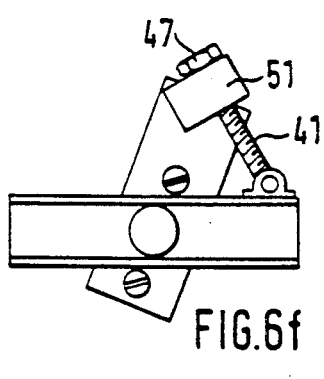
Figure 6G:
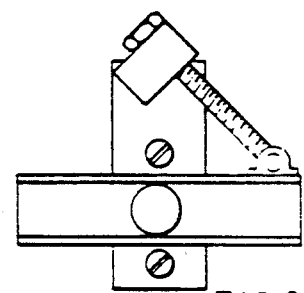
Figure 7B:
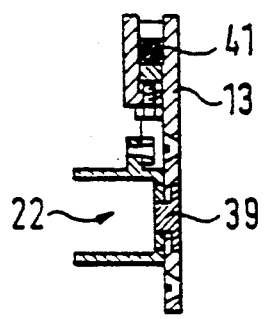
Figure 7A:
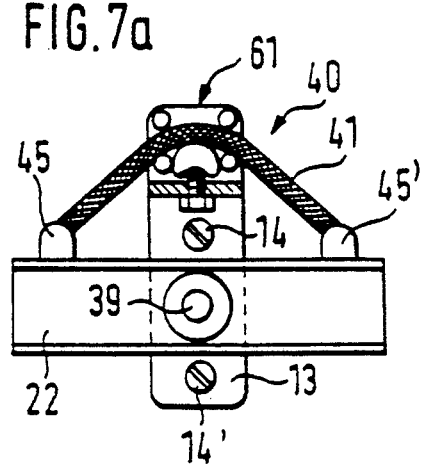
Figure 7C:
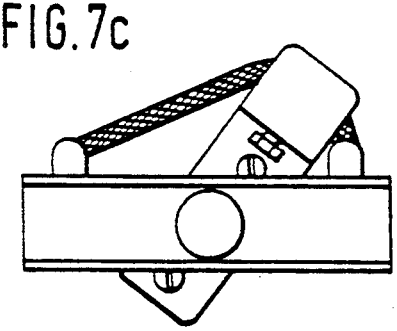
Figure 7D:
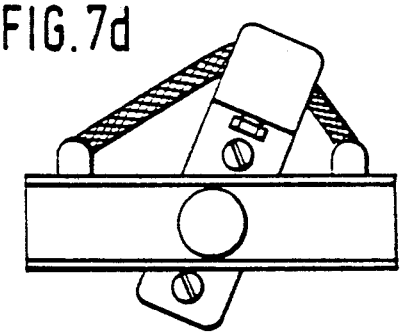
Figure 7E:
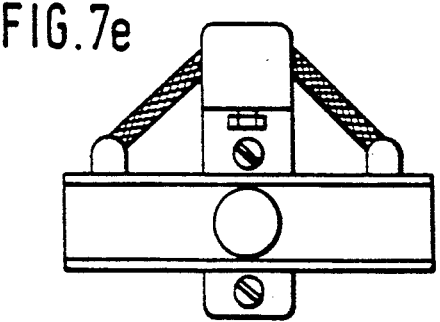
Figure 9C:
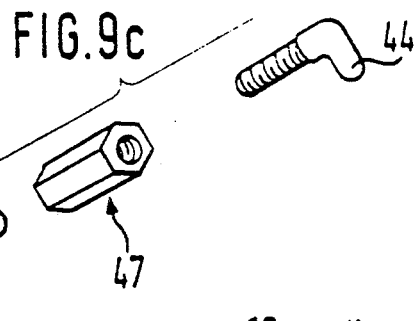
Figure 9B:
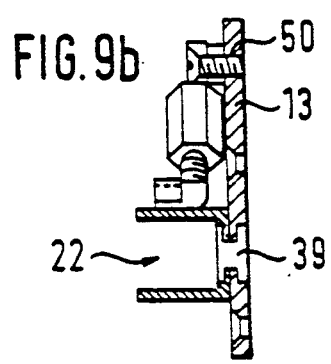
Figure 9A:
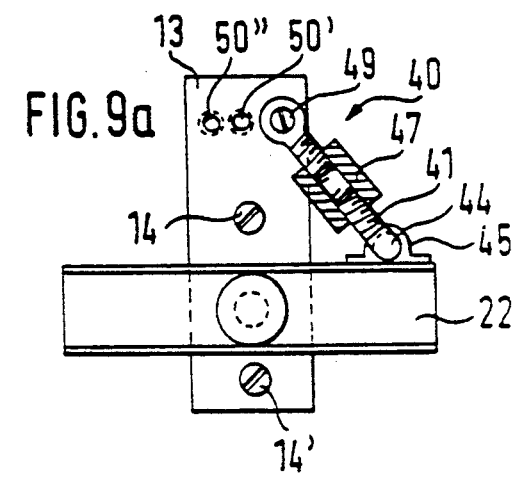
Figure 9D:
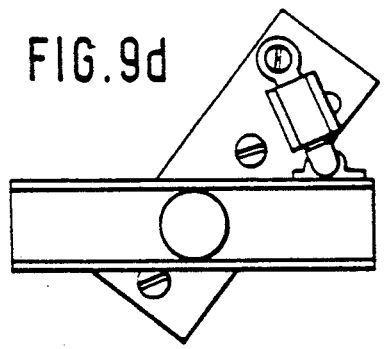
Figure 9E:
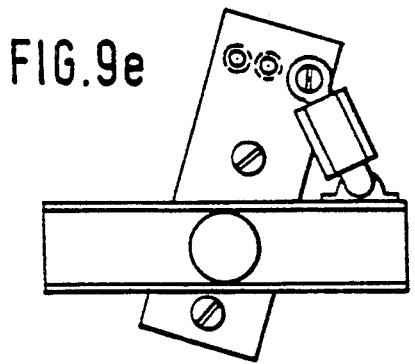
Figure 9F:
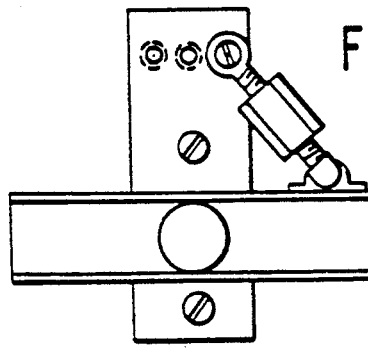
Figure 16A:
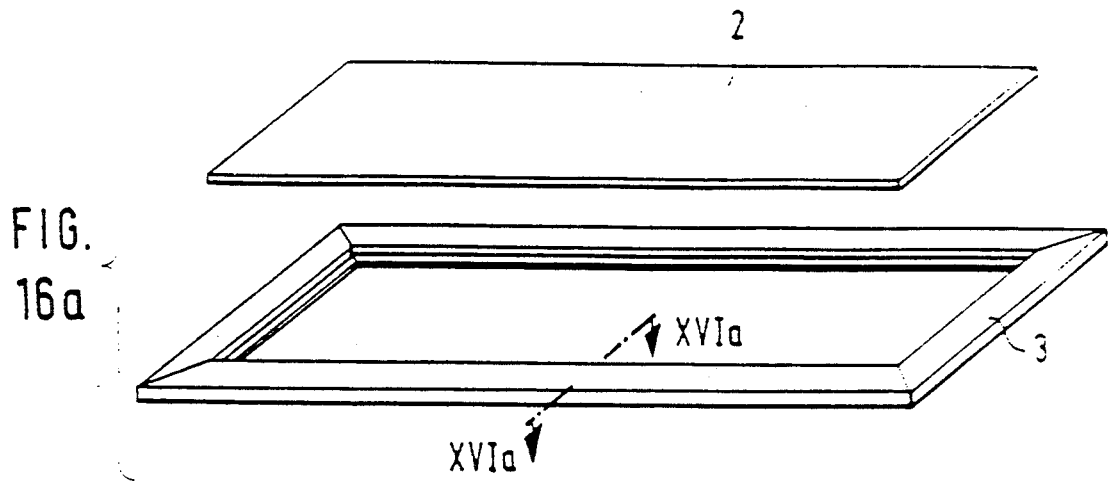
Figure 16B:
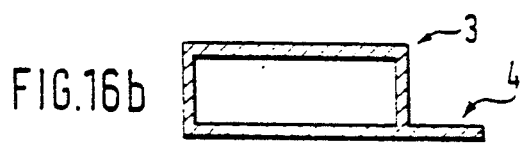

FIGS. 4a to 4c—various modes of post attachment at the connecting element shown in FIG. 3;

FIGS. 5a to 5i and 5k to 5o—partially sectional detail views of the connecting element according to FIG. 3;

FIGS. 6a to 12c—seven different preferred embodiments of connecting elements according to FIG. 2;

FIGS. 13a to 13f—preferred embodiments of modes of attachment between the connecting element and the post element;

FIGS. 14a to 14f—preferred embodiments of post elements according to FIG. 2;

FIGS. 15a to 15d—a preferred embodiment of an attachment between the connecting element and the post element;

FIGS. 16a and 16b—a preferred embodiment of a shelf board according to FIGS. 1 and 2;

FIGS. 17 to 20e—four different embodiments of the fastening devices between the shelf boards and all the connecting elements.

In the following description of the preferred embodiments the same reference numerals are invariably used to indicate same parts or parts having the same effects so that these elements are explained only once.

FIG. 1 illustrates the first preferred embodiment wherein each post element 10 consists of two bars 11 and 12. The shelves 11, consisting of a panel element 2 and a frame 3 receiving the panel, are fixed by means of connecting element 20. The fixing points may be selected in stages as will be explained in more detail hereinbelow. The specific structure now allows for erection of the post elements 10 both in completely vertical position and at a slope so that it is possible to take into full account not only the building conditions at the installation site but also the wishes in terms of taste.

In the alternative embodiment shown in FIG. 2 each post includes only a single bar (which may, of course, be assembled by means of several fixedly interconnected bars). Each connecting element includes a spindle element which is constituted by a join presenting one degree of freedom between the shelf panel 1 and the post element 10. This spindle element may now be locked by means of an anti-rotation locking element.

In the following, with reference to FIGS. 3 to 5, a preferred embodiment of a connecting element 20 will be explained, which is illustrated in FIG. 1. In that embodiment each connecting element 20 includes a rail 22 which may be used to panel 1. Locking elements 21, 21' are provided between the panel rail 22 and a pressure guide 30, with each of the elements being adapted to surround the tension a bar 11 or 12, respectively. In order to secure the locking elements 21, 21' the pressure guide 30 is tightened toward the panel rail 20 by means of screw elements whose cap nuts 38 are illustrated in FIG. 3, so as to exert a pressure onto the locking elements 21, 21' in a direction normal to the longitudinal extension of the bars 11, 12. The locking elements 21, 21' in that system are inserted into socket holes 28-28''' wherein they may be rotated about an axis extending in the extension of the surface of the panel boards 1, as long as the cap nuts 38 are not yet tightened. Both in the panel rail 22 and in the pressure guide 30 a plurality of such socket holes is provided whereof FIG. 3 illustrates only two (28, 28'') whereas the two other socket holes (28', 28''') are "occupied" by the illustrated locking elements.

When several socket holes 28-28''' are provided in this manner it is now possible to dispose bars 11, 12 at different interbar spacings, which is roughly indicated in FIGS. 4a to 4c. This means not only more freedom for the user in terms of taste but allows also for due consideration of stability criteria.

In the following a particularly preferred embodiment of the connecting element 20 illustrated in FIGS. 1, 3 and 4 will be described in more detail with reference to FIG. 5. FIG. 5a is a sectional view of an assembled connecting element with the inserted frame 3, with the locking element 21 being illustrated, for drawing reasons, in a position which per se is precluded. FIG. 5 shows that a connecting element 20 includes a panel rail 22 provided with several socket holes 25-25''' (FIGS. 5b to 5e). Moreover between every two socket holes 25-25''' are provided threaded stay bolts 26 which project from a crosstie 24 of the panel rail 22 in the direction of the plane of a shelf panel 1 and normal to the latter's longitudinal extension, which crosstie is supplemented by legs 23, 23' so as to form a U-shaped section. The locking elements 21, 21' include clamping half shells 33, 33' which in the embodiment according to FIG. 5 have a circular sectional area relative to the socket axis. For reasons of taste it is possible, of course, to define also other cross-sectional shapes. Each of the clamping half shells 33, 33' includes a pivot pin 34 which is so dimensioned that it may be inserted into a socket hole 25 with a small clearance only. Opposite to the pivot pin 34 post openings 37 are provided in the clamping half shells, which are adapted to the contour of the bar 11/12 to be clamped, i.e. which have thus a circular shape for round bars, a hexagonal shape for hexagonal bars, and a square shape for square bars. In this embodiment, the longitudinal directions of the post openings 37 extend orthogonally with respect to the center axes of the pivot pins 34.

In order to even enhance the stability of the locking elements 21, 21' adjustment bores 35, 35' are provided in the clamping half shells 33, 33' such that two clamping half shells 33, 33' may be torsionally interconnected by means of adjustment pins 36 whose ends are located in the adjustment bores 35, 35'. The adjustment bores 35, 35' of that embodiment are drilled into the clamping half shells 33, 33' so deeply that the two clamping half shells 33, 33' may be moved toward each other by a sufficient distance so as to close the post opening 37 by an extent that a bar 11/12 will be fixedly clamped therein.

The pivot pins 34 of the upper clamping half shells 33' (turned away from the shelf panel 1) are located opposite to the panel rails 22 in socket holes 28-28''' of supporting rails 27 which are provided with passages 29-29'' in addition to the socket holes 28-28''', through which the threaded stay bolts may be passed. The pressure guide 30, which in the embodiment illustrated here has a U-shaped cross-section whose legs project at least beyond the edge of the supporting rail 27, is used to compress the two clamping half shells 33, 33' such that the supporting rail is fixedly seized and that the torsional strength of the pressure guide 30 will be improved at the same time. As is shown in FIGS. 5f to 5h, the pressure guide 30 no longer presents any socket holes 25 but only passages 31-31'' for passing the threaded ends of the stay bolts 26 therethrough. In that embodiment the stay bolts 26 have a length so dimensioned that the cap nuts may be screwed on by a distance sufficient to allow for tight clamping of the clamping half shells 33, 33' to each other through the pressure guide 30 when the bar 11/12 is inserted. During that tightening operation a frictional connection between an inserted bar 11/12 and the clamping half shells 33, 33' is achieved and moreover a frictional connection is ensured between the clamping half shells 33, 33' and the panel rail 22. The latter frictional connection, which constitutes an anti-rotation locking mechanism, is not definitely required in the embodiment according to FIGS. 1, 3 and 4 when the interbar distance between the bars 11 and 12 are maintained constant by means of structural elements. In any case, however, a reinforcement of the assembled shelf is achieved.

In the following various embodiments of connecting elements 20 will be described in more detail which are used in the alternative embodiment with integral post elements according to FIG. 2 and which may be combined with each other in the majority of cases.

In the preferred embodiment according to FIG. 2 a panel rail 22 is provided, too, for attachment of the connecting element at the frame 3 of a panel board. This panel rail 22 is connected to a post rail 13 through an axle journal 39 (without clearance). The post rail 13 may be attached to a post element 10 by means of fastening screws 14, 14'.

Between the post rail 13 and the panel rail 22 a connecting element 41 is so disposed that each of its ends is fixed at one element, respectively. In the first preferred embodiment illustrated here the connecting element 41 is provided with a threaded section having a side pin 44 which is bent off at a right angle relative to the longitudinal extension of the threaded section. This side pin 44 is inserted into a shackle 45 attached at the panel rail 22 so that the connecting element 41 may be tilted in the plane extending vertically to the surface of the shelf panel in the longitudinal extension of the shelf.

A setting nut 47 is screwed onto the threaded section of the connecting element 41, the end of this nut which faces the shackle 45 being provided with a stud 52 with an external thread. The setting nut 47 is inserted into a holder 51 which is fastened at the post rail 13 by means of a connecting screw 49 (or a rivet) for rotation in a direction normal to the longitudinal axis of the connecting element 41. In order to secure the setting nut 47 in the longitudinal direction relative to the connecting element 41 in the holder 51 a nut 53 is screwed onto the threaded stud 52. The connection so assembled is thus appropriate to absorb both tensional forces and thrust. The connection established in this way may be infinitely adjusted over wide ranges, as is exemplified by FIGS. 6e to 6g. The basic principle of the system consists in the aspect that the position of the leg opposite to the pivot passing through the axle journal 39 is varied whilst the other two legs remain unchanged.

The other preferred embodiment illustrated in FIG. 7 is based on the same principle of motion, with the connecting element 41 being designed as rope or chain. The two ends of the connecting element 41 are connected through shackles 45, 45' to the panel rail 22, these two shackles 45, 45' being equidistant from the axle journal 39. The connecting element 41 may be secured at the post rail 13 by means of a clamping means 61 including a clamping screw acting upon a clamping element which may be displaced between guide pins toward abutment pins. The disposition of the clamping screw in this embodiment is so selected that it may also be employed to compensate the connecting element in length, which may be necessary as a function of the selected angular position.

In the third preferred embodiment illustrated in FIG. 8, the anti-rotation locking element 40 includes a bar 42 whose one end is provided again with a side pin 44 bent off at a right angle and adapted for insertion into the shackle 45 at the panel rail 42. The other end of the bar 42 is provided with a boss 43. This boss 43 may be used to secure the bar 42 on a slide 48, with a connecting screw 49 of the slide 48 is protecting through the boss 43 such that the bar 42 may be secured by means of a cap nut.

The slide 48 is provided with a tapped hole through which a setting screw 47 is passed which is fixedly, even though rotatably, mounted between legs 46, 46', in the longitudinal direction. The legs 46, 46' project from the post rail 13 toward the shelf panel in a way that the setting screw 47 will extend vertically with respect to the longitudinal extension of the (non-illustrated) post.

When the slide 48 is displaced due to the rotation of the setting screw 47 the angle enclosed between the shelf panel and the post element may be set. The setting range may be widened by the provision of a set of bars 42 of different lengths, as is illustrated in FIGS. 8c/d or 8e/f, respectively. On the assumption that the length of the bar 42 is constant it is not the position of the opposite leg in the axle journal 39 which is varied but rather is the position of its tip infinitely set with respect to the axle journal 39 by means of the setting screw 47.

In the fourth preferred embodiment illustrated in FIG. 9 an infinitely variable length of the connecting element 41 may be achieved, like in the embodiment according to FIG. 6, with additional provisions for a graded variation of the relative position of the end of the connecting element relative to the axle journal 39, like in the embodiment illustrated in FIG. 8. In that preferred embodiment the length of the connecting element 41 is varied by means of a setting screw 47 which, like in case of a stay tightener known per se, is provided with a left-hand thread at one end and with a right-hand thread at the other end, whilst the threaded sections of the tensioning element 47 are provided with matching threads. Several tapholes 50–50''' are provided in the post rail 13 for setting of the terminal point by which the connecting element 41 is connected to the post rail 13. In the following, another preferred embodiment of a connecting element will be described in more detail with reference to FIGS. 10a–c, which requires for infinitely variable operation that at least in certain sections a slot 15 is provided in the post element 10. In that preferred embodiment the post rail is subdivided into two sections whereof the first one 13 is connected to the panel rail 22 through the axle journal 39 so as to be prevented from rotating, whereas the second section 13' is connected merely to the end of the connecting bar 42 (at the latter's boss 43). With a suitable adjustment of the distance s between the post rail sections 13 and 13' it is possible to set the angle enclosed between the post and the shelf panel, with the length of the leg terminating in the axle journal 39 being varied in this case. This embodiment is of a particularly uncomplex design.

Figure 10A:
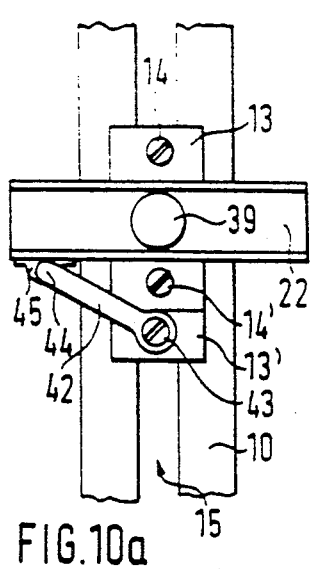
Figure 10B:
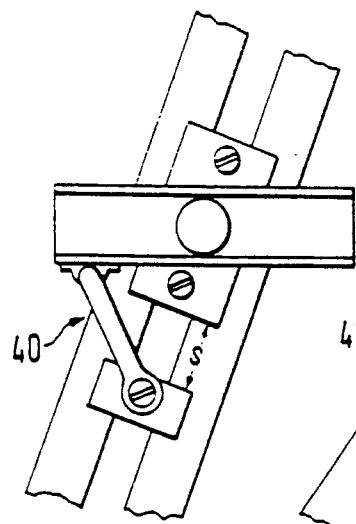
Figure 10C:
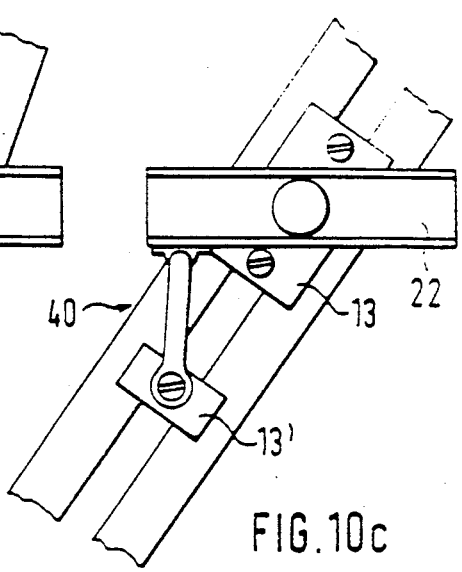
Figure 10D:
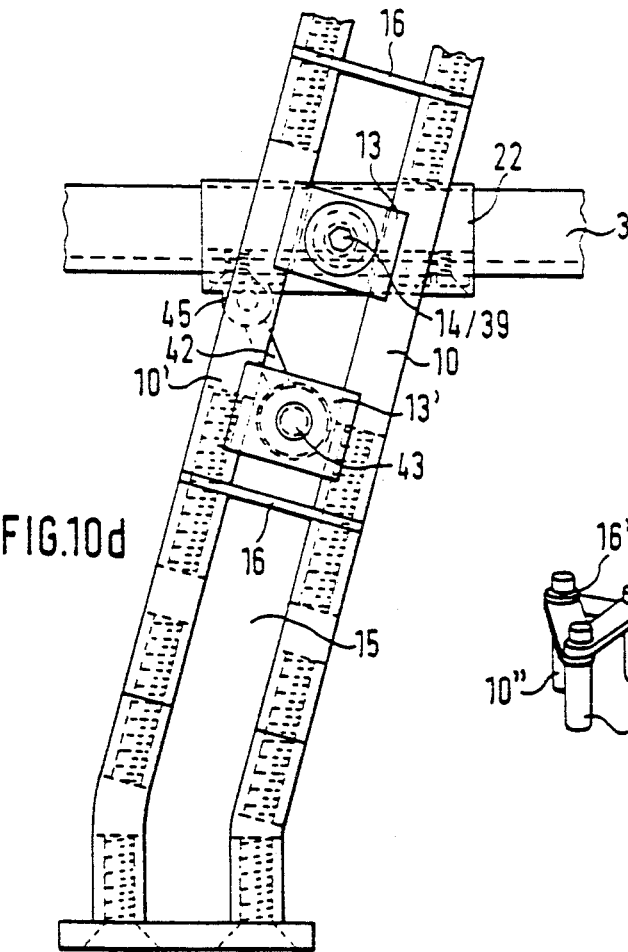
Figure 10E:
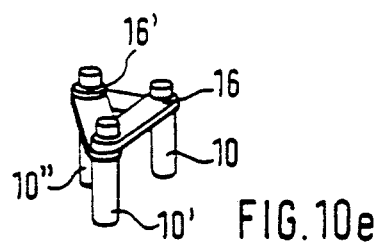
Figure 13A:
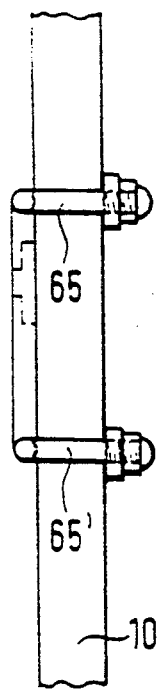
Figure 13B:
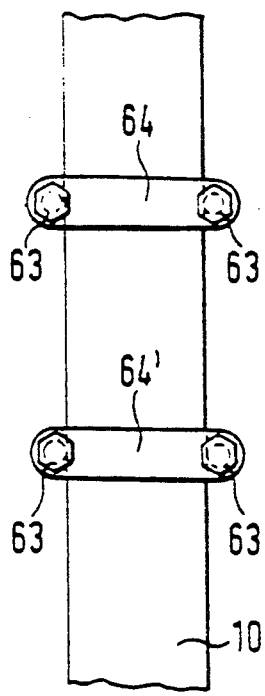
Figure 13C:
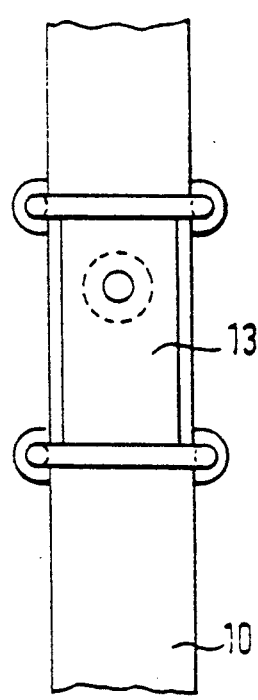
Figure 13D:
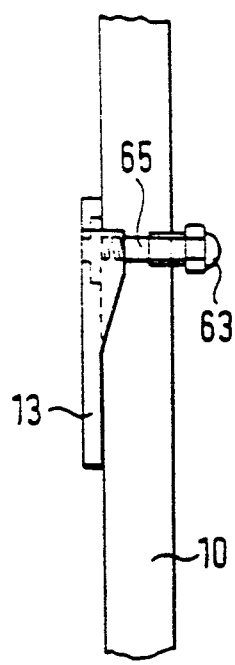
Figure 13E:
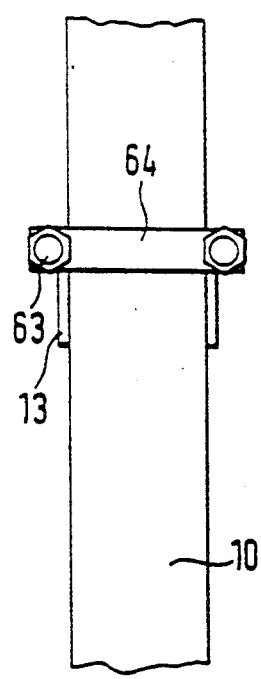
Figure 13F:
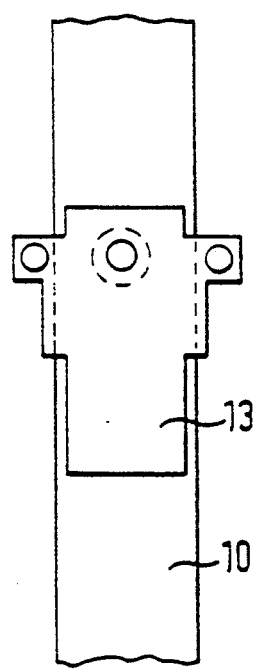

In the preferred embodiment illustrated in FIG. 10d the slot 15 is formed by maintaining two bar elements 10, 10' in spaced relationship by means of connecting elements 16. The connecting elements 16 of this embodiment are simple flat strips with passages while the post elements 10, 10' consist of tubular pieces with internal threads at the ends which are interconnected by means of threaded studs (indicated by the dashed lines in FIG. 10d). The bores of the connecting elements 16 correspond to the external diameter of the threaded studs so that each connecting element 16 is secured between two post element pieces which are screw-fastened to each other in telescoped arrangement. As is illustrated in FIG. 10e this mode of design allows for the assembly of an even more stable post element, e.g. an element presenting a triangular or multi-edge contour. It is moreover possible with that preferred embodiment to provide standardized arched elements which may then be fastened in a base plate (cf. FIG. 10d).

By contrast to the embodiment illustrated in FIGS. 10a-c, in the preferred embodiment shown in FIG. 10d the post rail 13 is attached by means of a single fastening screw 14 which constitutes the axle journal 39 at the same time. In all other respects, this preferred embodiment substantially corresponds to that of FIGS. 10a-c.

Another preferred embodiment of a connecting element is illustrated in FIG. 11. In that system the shelf may be adjusted in a graded rather than an infinitely variable form, with the connection between the post rail 13 and the panel rail 22 being established by means of a connecting element 41 which is adapted for being secured to the panel 22, on the one hand, by means of dovetail guides consisting of grooves 55 and tongues 54, 54', and, on the other hand, at the post rail 13 such that it may absorb torques effective about the axle journal 39 in either direction. In this embodiment a tongue 54 is provided directly at the panel rail 22 while a groove for insertion of the tongue 54' of the connecting element 41 is provided in a groove base 60 which is covered and secured by a top plate 59 which is adapted to be secured on a leg 58 by means of a screw, this leg projecting vertically from the plane of the post rail 13. The retaining element 56 so constituted prevents the connecting element 41 from sliding out. In order to allow for the setting of a plurality of angular positions a corresponding set of connecting elements 41 is appropriate as it is illustrated in FIGS. 11f to 11m. With such a set it is possible to achieve particularly acute angles between the post element and the shelf board if the tongue 54 located at the panel rail 22 is made substantially narrower than the tongue 54' of the connecting element 41, which is located in the retaining element 45. In that case, as a matter of fact, the groove 55 of the connecting element 41 may project into the interior of the tongue 54' (FIGS. 11l and 11m).

Another preferred embodiment of the connecting element is illustrated in FIG. 12. In that case the system is based on a post element formed of pairs of element sections 10 and 10' (in the present case round bars) leaving a slot 15 therebetween. In that embodiment of the present invention, the axle journal 39 is constituted by a screw projecting toward the post element 10 or its slot 15, which screw passes through a bore in the post rail 31. The terminal threaded section lf the axle journal 39 projects through the bore of an abutment part 64 which, by means of a securing nut 63, may be tightened in a direction toward the post rail 13 such that, on the one hand, the post element sections 10, 10' are strongly pressed against the post rail 13 so as to form a frictional connection, whilst, on the other hand, the back of the panel rail 22 is strongly pressed against the top of the post rail 13 so as to ensure there a frictional connection as well. To increase the torsional stability of this connection preferably a notch 42 is provided in the bearing surfaces between the panel rail 22 and the post rail 13, which is indicated in dashed lines in FIG. 12a. When thus in that embodiment a single (cap) nut 63 is tightened not only the post rail 13 is secured at the post element 10 but also the anti-rotation connection between the post rail 13 and the panel rail 22 is achieved at the same time.

When the post element is not provided with a slot and when rows of tapholes are to be avoided for attachment of the post rails 13 the clamp systems are appropriate which are illustrated in FIG. 13. In that system clamping elements 65, 65' are provided which project from the side of the post rails 13 and cooperate with abutment parts 64 so as to form closed frames. The abutment parts 64 may be tightened by means of securing nuts 63 in a direction toward the post rails 13.

When at least in certain sections slots 15 are provided in the post elements 10, as has been indicated already in relation to FIG. 12 the attachment (which is substantially infinitely variable) of post rails 13 at the post elements 10 is particularly simple. In a preferred embodiment the post elements are constituted by two identical elements 10, 10' which are interconnected by means of connecting elements 16, 16' so as to form a slot 15. In that design substantially any cross-sectional shape of the elements 10, 10' may be chosen, as becomes obvious from FIGS. 14a to 14f. A further advantage of this embodiment of the post elements resides in their particular rigidity without requiring an excessively great expenditure in material.

The preferred embodiment of connecting elements, which are illustrated with reference to FIGS. 6 to 11, may be fastened by means of the (fundamental) systems shown in FIG. 15, provided that these post elements present slots 15. The way in which the post rail 13 is attached at the post element 10 in that embodiment corresponds to the manner illustrated in FIG. 12, however with the distinction that the axle journals 39 are separate and instead the fastening screws 14 are provided for tightening the abutment elements 64.

FIG. 16 shows a perspective and a sectional view of a shelf board or a frame, respectively. This illustrations reveals that the frame 13, which is preferably made of a stable material such as metal, includes a substantially rectangular frame section provided with a support strip 4 projecting into the frame. Any panel element may be inserted into the frame 3 so formed, with the selection of the material being left to the user's option since the stability of the system is ensured by the frame 3.

Various systems may be selected to connect a panel rail 22 to the frame 3 (and thus to the shelf panel 1), each of these systems entailing its specific advantages, which will be explained in more detail hereinbelow.

Figure 17:
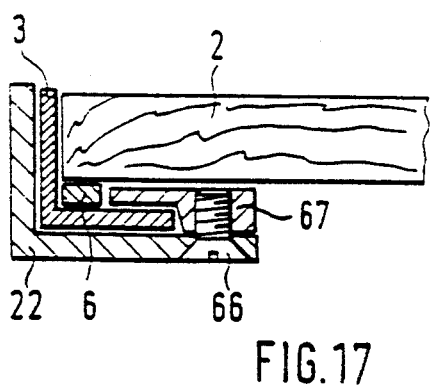

In the arrangement according to FIG. 17 the panel rail 22 presents an L-design wherein the leg parallel to the panel element 2 is provided with a bore for attachment of a shackle 67 by means of a screw 66 at the panel rail 22. The shackle 67 engages into the interstice between the frame 3 and the panel element 2, which is defined by a spacer element 6 between the frame 3 and the panel element 2. When the panel element 2 is fastened in the frame 3, e.g. by front-side screws, bondings or the like, the frame 3 may present an L-shaped cross-sectional area. Such an arrangement ensures that firstly the frame 3 will be tightly fastened in the panel rail 22 in a direction toward the post element, and that secondly the frame 3 is secured so as to be prevented from being lifted upward from the panel rail 22.

Figure 18A:
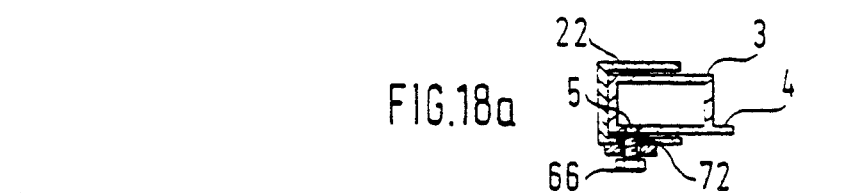
Figure 18B:
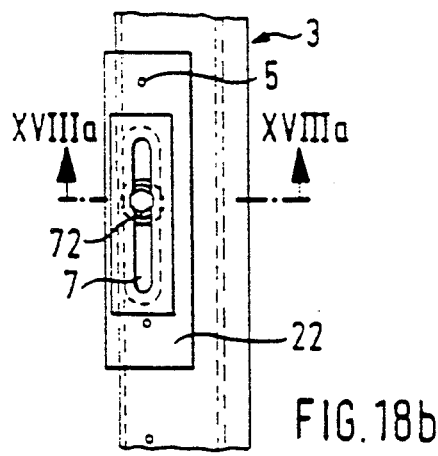
Figure 19A:
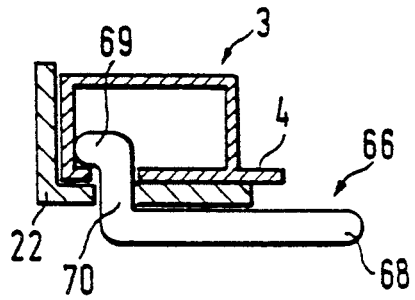
Figures 20A, 20B:
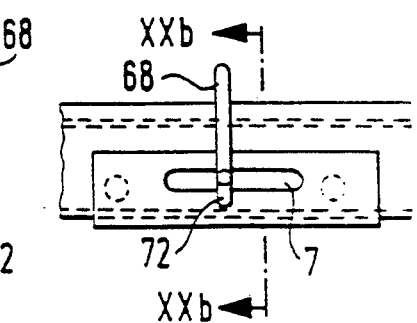
Figure 19B:
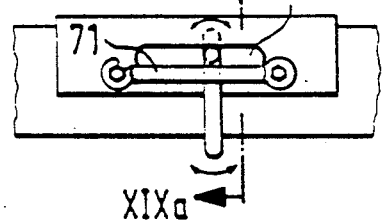
Figure 20C:
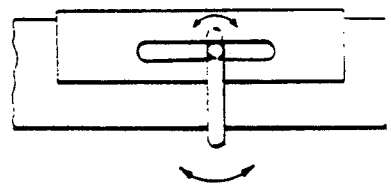
Figure 19C:
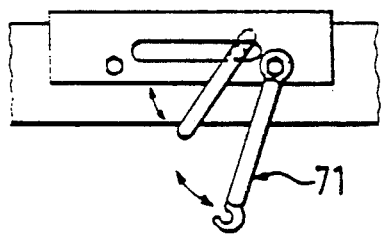
Figure 20D:
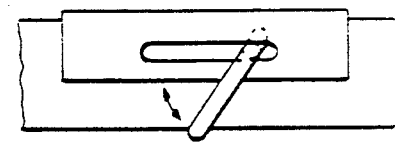
Figure 19D:
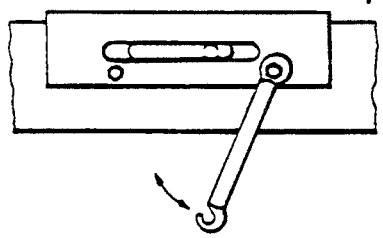
Figure 20E:
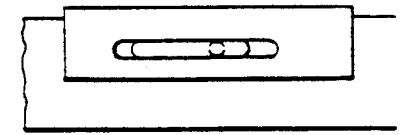

In the preferred embodiment according to FIG. 18, the panel rail 22 presents as U-shaped cross-sectional area so that the frame 3 is safely retained between the legs of the panel rail 22 both in the upward and downward directions. To prevent the frame 3 from sliding out of the U-shaped panel rail 22 bores 5 (or even oblong holes) are provided in the frame 3 for engagement of tightening elements 66 designed as screws. The screw-type tightening elements 66 are screwed into threaded portions 72 which are secured in oblong holes 7 so as to be prevented from rotating but arranged for displacement in the longitudinal direction, which holes are disposed in parallel to the shelf panel in the panel rail 22. This provision, too, provides for an infinitely variable attachment of the panel rails 22 at the frame 3.

In the preferred embodiment illustrated in FIG. 19, a two-throw crank lever is provided whose handle 68 is connected to a projection 69 through a connecting portion 70. The connecting portion 70 is passed through an oblong hole 7 in the panel rail 22, which is of an L-shaped cross-section, and through another oblong hole in the frame 3. When the attachment of the panel rail 22 at the frame 3 is desired in that system first of all the securing element 66 is so placed that the longitudinal axis of the projection 69 extends in parallel to the longitudinal axis of the oblong hole 7, whereupon the projection 69 is inserted into the frame 3. When the securing element is then swiveled by means of the handle 68 in a way that the handle 68 projects away from the (non-illustrated) post element in a direction vertical to the longitudinal extension of the oblong hole 7 the frame 3 is drawn into the panel rail 22. Then a securing bracket 71 (FIGS. 19b to 19d) is placed on top of the handle 68 whereupon it is fastened at the panel rail 22 such that the handle 68 is hinged down toward the panel board 1. This folded-down condition secures the panel board 3 from being lifted upward out of the panel rail 22.

In the preferred embodiment shown in FIG. 20, which resembles that illustrated in FIG. 19, the locking of the handle 68 is achieved by the provision of a second projection 72 which projects from the connecting element 20 in the same direction (i.e. in an extension of the handle 68) as the first projection 69. This way of connection is particularly easy to handle; in this embodiment, too (like in the embodiments according to FIGS. 17 and 19) the panel rail 22 may also be L-shaped, which is desirable from an aesthetic viewpoint.

I claim:

1. A shelf system comprising:
   a) at least one shelf panel;
   b) at least two post elements, each post element including at least two bars; and
   c) means for connecting the at least one shelf panel in a horizontal position to the post elements, said means for connecting including:
   i) a joint with one degree of freedom;
   ii) means for locking said connecting element to said shelf panel at a position along the edges of said shelf panel; and
   iii) a plurality of locking elements spaced from each other in a direction parallel to the edges of said shelf panel, whereby each bar is fixedly mounted by said locking elements to a connecting element;
   such that each shelf panel is adapted to be fixed in a horizontal position and prevented from tilting at at least two post elements adapted to be inclined at an angle with respect to each other.

2. A shelf system comprising:
   a) at least one shelf panel;
   b) post elements, each post element being a single bar; and
   c) means for connecting the shelf panel in a horizontal position to the post elements such that the post elements lie in a plane perpendicular to the horizontal surface of the shelf, at least one post element intersecting the plane in which said shelf surface lies at an angle differing from 90°, each means for connecting including:
   i) a joint with one degree of freedom, having a pivot element extending perpendicular to an edge surface of said shelf panel and adapted to be secured at said post element; and
   ii) at least one anti-rotation locking element which may be secured between said post element and said shelf panel.

3. Shelf system according to claim 1, each of said locking elements further comprising means to secure said locking element between the shelf panel and the bar so as to be prevented from rotation.

4. Shelf system according to claim 1 said locking elements being adapted to be secured by means of a joint retaining system.

5. Shelf system according to claim 1 wherein each of said locking elements comprises clamping half shells adapted to be tightened toward each other for clamping a bar therebetween.

6. Shelf system according to claim 1 each of said means for connecting comprising more than two bearing elements spaced from each other for optional accommodation of appropriate socket elements of locking elements.

7. Shelf system according to claim 2, wherein said anti-rotation locking element comprises a connecting element having one end secured at a first attachment point at the shelf panel at a distance from said pivot element and a second end secured at an attachment point at the post element, also at a distance from said pivot element.

8. Shelf system according to claim 7, further comprising means for adjusting the length of said connecting element between said attachment points.

9. Shelf system according to claim 7, further comprising means for setting the distance of at least one of said attachment points from the pivot element.

10. Shelf system according to claim 8, each said setting means.

11. Shelf system according to claim 8, said connecting element comprising a resiliently deformable traction element.

12. Shelf system according to claim 2, wherein said anti-rotation locking element comprises a set of inserts graded by sizes, which are adapted to be connected to both a shelf panel and a post element at the same time by means for fastening.

13. Shelf system according to claim 2, said anti-rotation locking element comprising a tightening means for frictionally locking said pivot element.

14. Shelf system according to claim 1, said means for connecting comprising panel rails adapted to be secured by said rails to said shelf panel.

15. Shelf system according to claim 2, said means for connecting comprising post rails adapted to be secured at said posts.

16. Shelf system according to claim 14, wherein said post rails are connected to said panel rails by means of said pivot elements so as to allow for rotation relative thereto.

17. Shelf system according to claim 15, said posts comprising slots in their longitudinal extension, in which slots said post rails may be secured by a means for clamping.

* * * * *